United States Patent [19]

de Pous

[11] 4,264,547
[45] Apr. 28, 1981

[54] SILICON NITRIDE-BASED SINTERING COMPOSITION

[75] Inventor: Olivier de Pous, Geneva, Switzerland

[73] Assignee: Battelle Memorial Institute, Geneva, Switzerland

[21] Appl. No.: 88,598

[22] Filed: Oct. 26, 1979

[30] Foreign Application Priority Data

Nov. 8, 1978 [CH] Switzerland ............... 11472/78

[51] Int. Cl.³ .................................... C04B 35/58
[52] U.S. Cl. ...................... 264/65; 106/73.4; 106/73.5
[58] Field of Search ............. 106/73.4, 73.5; 264/65

[56] References Cited

U.S. PATENT DOCUMENTS

| 3,950,464 | 4/1976 | Mosaki | 106/73.5 |
| 3,953,221 | 4/1976 | Lange | 106/73.5 |
| 3,989,782 | 11/1976 | Lumby et al. | 106/73.5 |
| 3,991,166 | 11/1976 | Jack et al. | 106/73.5 |
| 3,992,497 | 11/1976 | Terwilliger et al. | 106/73.5 |
| 4,073,845 | 2/1978 | Buljan et al. | 106/73.5 |
| 4,099,979 | 7/1978 | Lange et al. | 106/73.5 |

Primary Examiner—O. R. Vertiz
Assistant Examiner—Mark Bell
Attorney, Agent, or Firm—Karl F. Ross

[57] ABSTRACT

Silicon nitride-based powder composition enabling materials of densities exceeding 3.10 g/cm³ to be obtained by pressureless hot sintering. This composition contains, intimately mixed by pulverisation, $Si_3N_4$ having a particle size not exceeding 1 μm and up to 6% by weight of a densification aid comprising very finely ground magnesium oxide and aluminium oxide. This composition enables mechanical parts to be economically manufactured by moulding followed by sintering, their properties being practically equivalent to those of parts obtained by machining hot pressed blocks of $Si_3N_4$.

6 Claims, 1 Drawing Figure

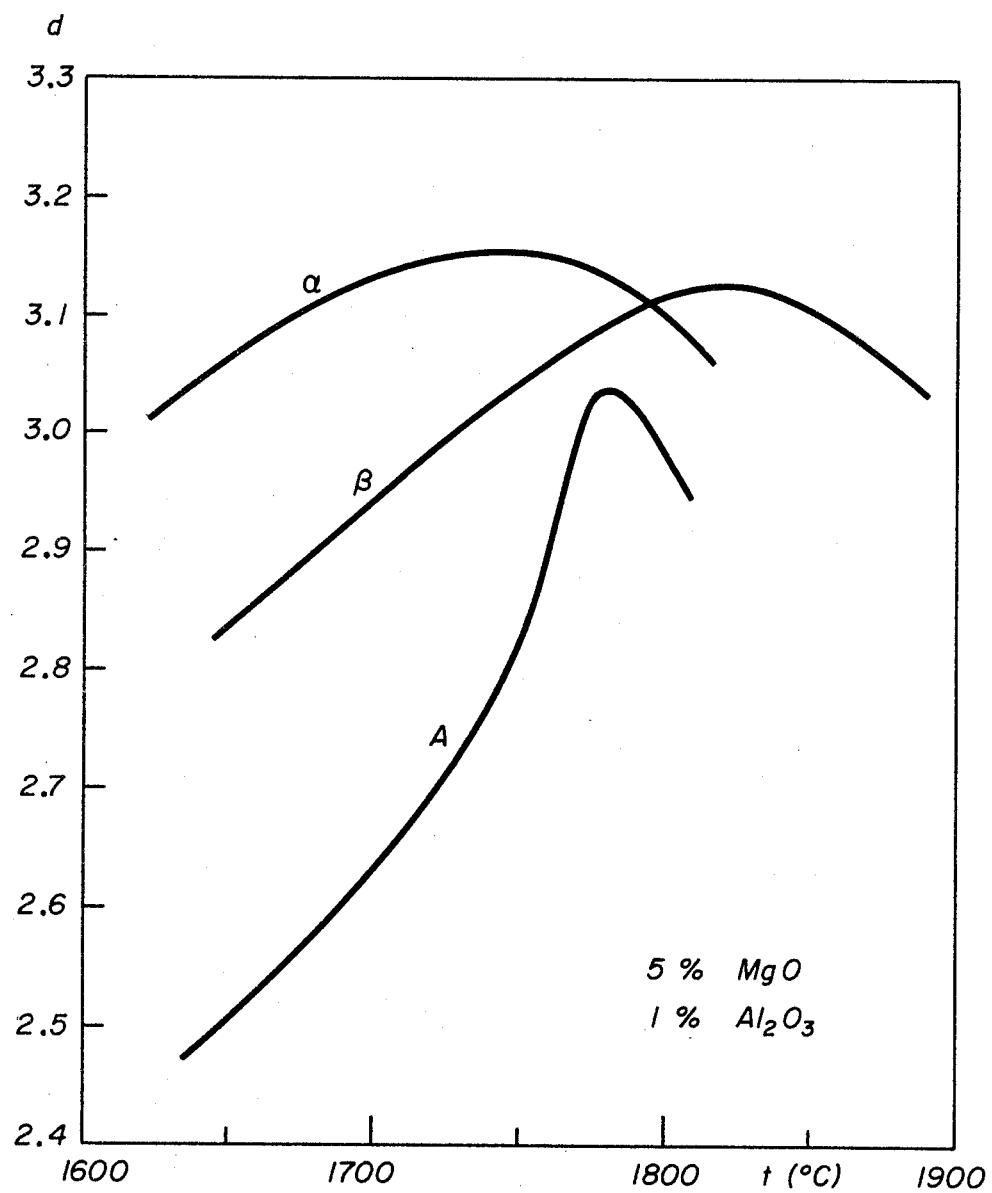

SILICON NITRIDE-BASED SINTERING COMPOSITION

FIELD OF THE INVENTION

This invention relates to a powder composition based on silicon nitride $Si_3N_4$. This composition enables sintered $Si_3N_4$ objects to be prepared by thermal sintering such objects having a density very close to the theoretical density (3.19 g/cm$^3$). The invention also relates to the method for applying said composition to the manufacture of articles formed from silicon nitride by thermal sintering.

BACKGROUND OF THE INVENTION

Silicone nitride is known to be very hard material which is suitable for manufacturing parts having high mechanical strength at high temperature (shafts, gas turbine blades, parts in contact with liquid metals, block bearings, ball bearings, sealing segments etc.), provided its degree of porosity is low. In this respect, the higher the degree of porosity of this material, the less it resists breakage forces and hot oxidation corrosion. A $Si_3N_4$ of very low porosity can be manufactured which is suitable for the aforesaid applications by hot anisotropic mechanical pressing. By this method, compact $Si_3N_4$ is obtained in the form of blocks, which are very costly to convert into mechanical parts because of the extreme hardness of the material, the special tools (diamond wheels) required for their machining, and the slowness of this work. Thus, an active attempt has been made during recent years to directly form parts by molding or stamping powder compositions based on $Si_3N_4$, followed by hot sintering of the castings under an inert atmosphere. In doing this, the following three basic factors have proved important: the addition of densification aids, the use of powders of fine particle size (of the order of 1 to a few µm) and, during sintering, the use of a relatively high nitrogen pressure, of the order of 2 to 50 atmospheres. By means of these improvements, densification levels of the order of 95 to 97% of the theoretical density are now expected (3.03–3.097 g/cm$^3$).

The most important publications in this field include, for example: "Pressureless sintered silicon carbide" by I. ODA, M. KANENO and N. YAMAMOTO, Research and Development Laboratory, NGK Insulators Ltd., Mizuho, Nagoya, Japan; Yogyo Kyokai Shi 1976, 84 (8), 356–60 (Japan); Japan J. Mater. Sci 1976, 11 (6), 1103–7; Japanese Kokai patent specification 77 47,015; Yogyo Kyokai Shi 1977, 85 (8), 408–12; G. R. TERWILLIGER & F. F. LANGE, Journal of Materials Science 10 (1975), 1169–1174; U.S. Pat. No. 3,992,497 and "Sintering of silicon nitride" by D. J. ROWCLIFFE & P. J. JORGENSEN, Stanford Research Institute, Menlo Park, Calif.

The most used densification aids include MgO (5%); $Al_2O_3+Y_2O_3$(10–50%); BeO(1.25%)+MgO(3.75%); BeO(1.25%)+MgO(3.75%)+$CeO_2$(5%), etc.

It is nevertheless be desirable to attain even higher densification levels, in order to reduce the porosity levels, as the existing pores can be a source of cracks in the final pieces. To attain this, the theoretical density of 3.19 g/cm$^3$ should be approached as closely as possible, while at the same time using as small a proportion of aids as possible in order to preserve the most favorable mechanical properties in the sintered material, such as hardness, resistance to bending, resistance to tensile stress and resistance to breakage, particularly at high temperature. Thus, it is useful to note that if powders are used containing relatively high proportions of densification aids, the mechanical properties, which are good at low temperature, can become mediocre at high temperature. Thus, if the aforesaid $BeO+MgO+CeO_2$ is used, the modulus of rupture passes from 83 kg per mm$^2$ at ambient temperature to 4 kg/mm$^2$ at 1400° C. On the other hand, $Y_2O_3$ is expensive, and BeO is undesirable because of its toxicity. Moreover, it is economically preferable to sinter at atmospheric pressure rather than at a higher pressure, because in this manner the problems relative to the strength of materials at high temperature under pressure, such as sealing furnaces operating in the region of 1500°–2000° C., can be avoided.

Recently, pressureless sintering of a $Si_3N_4$ powder containing 10 mol % of spinel (Mg aluminate) for 4 hours at 1850° C. has been described, leading to a densification exceeding 96% and the formation of a material having an ultimate bending strength of 72 kg/mm$^2$, which is high (see Yogyo Kyokai Shi 1976, 84 (10), 508–12). It is also interesting to note that according to this reference, it is not possible to obtain equivalent results by using MgO and $Al_2O_3$ powders instead of spinel.

Object of the Invention

It is the object of the invention to improve upon the results hitherto obtained in the prior art. It is precisely on the use of components such as MgO and $Al_2O_3$ that the present invention is based, and which suprisingly enables products to be obtained having a better or at least equivalent quality to those of the prior art. Furthermore, the present method for using the composition of the invention for sintering molded objects is more economical than known methods, because it does not require, as the latter methods require, any complicated heating programme during the sintering operation (for example graduated heating), and the heating time required is very short.

The present composition contains powdered $Si_3N_4$, plus magnesium oxide and aluminum oxide as aids. The particle size of the $Si_3N_4$ used is less than 1 µm, and the particle size of the aids is less than the particle size of the $Si_3N_4$. It is essential that in the composition the total of the aids does not exceed 6% by weight of the composition, and the MgO:$Al_2O_3$ weight ratio lies between 10:1 and 1:3.

In this connection, the standard Search Report carried out following the convention filing of this application has revealed a number of additional pertinent references which are listed below:

U.S. Pat. No. 3,953,221 (LANGE) concerns the pressureless sintering of powder mixtures of $Si_3N_4$, $Al_2O_3$ and MgO. In this mixture, the ratio of the sintering aids to $Si_3N_4$ is never below 20:80 and the density of the obtained articles does not appear to exceed about 95–96% of theory. Therefore, this reference does not anticipate the present invention nor does it make it obvious.

U.S. Pat. No. 4,073,845 (SYLVANIA) concerns a powder mixture consisting of $Si_3N_4$ and, optionally, MgO and $Al_2O_3$, for the pressureless hot sintering of silicon nitride articles, the density of which may reach about 96% of theory with a rupture modulus in the vicinity of 10$^5$ psi=79 kg/mm$^2$. The reference indicates that the preferred amount of MgO is about 5% or less and that the particle size of the $Si_3N_4$ is less than $3\mu$ and, preferably, $0.5-1\mu$; it says nothing, however, about the possible usable quantities of $Al_2O_3$.

These indications, taken alone, may appear to come very near the present invention. However, this reference strongly stresses the importance of having, in the starting powder, a definite ratio of crystalline $Si_3N_4$ to amorphous $Si_3N_4$ (ratio from 5% to 6%) for obtaining the optimum properties of the sintered article. For instance, the property versus % crystallinity curves have a maximum when the % crystallinity of the $Si_3N_4$ is about 20%. This behaviour does not at all correlate with the results of the present invention. Thus, the products of the reference and that of the invention are not comparable since, in the invention, satisfactory sintered articles can be obtained from any form of $Si_3N_4$ ($\alpha$, $\beta$, amorphous, or mixtures thereof). Further, the properties of the sintered articles are definitely better in the invention (densities of 98-98.5%).

C.A. 80, 231, 111869 m (Japanese Patent Application No. 731 79,216 TOKYO SHIBAURA) concerns the hot sintering of $Si_3N_4$-$Al_2O_3$ mixtures (ratio 99.9:0.1-80:20) after cold compression moulding. $Si_3N_4$ particles are $0.5\mu$ and $Al_2O_3$ particles are $0.2\mu$. MgO is not indicated and the bending strength of the sintered articles is only in the range of 55 kg/cm². Therefore this reference does not anticipate the invention.

The German publication DOS No. 23 53 093 (TOYOTA) concerns the hot pressureless sintering of mixtures of $Si_3N_4$ with 8 to 40% of mixtures of metal oxides, for example a mixture of MgO and $Al_2O_3$. The method provides articles having densities reaching 3.13 and rupture moduli reaching 65 kg/mm² which values are not much below that of the invention. However, by looking closely at the examples of the reference, it is apparent the highest performances are obtained when the MgO and the $Al_2O_3$ are first reacted together to produce spinel, the latter having to be subsequently finely ground before mixing with the $Si_3N_4$. In contrast, if in the invention, the factor relating to the size ratio of the $Si_3N_4$ and the sintering aid particles are correctly implemented, high performance sintered articles are obtained without having to go through the spinel step. This is economically important and constitutes a marked advantage of the invention over the reference.

British Pat. No. 1,485,384 (LUCAS) concerns a process for sintering $Si_3N_4$ together with a first and a second metal oxide, such metal oxides (not specifically named) being selected for having the properties of forming low melting silicates with the silica possibly present within the $Si_3N_4$. An example of the reference indicates that the metal oxides are MgO and $Fe_2O_3$. Therefore, this reference does not affect the novelty of the invention.

Therefore, none of the most pertinent references uncovered by the Standard Search Report taken individually or in combination, should affect the novelty or the inventive activity of the present invention.

In addition, the method for using the composition according to the invention for manufacturing sintered $Si_3N_4$ parts of high strength is characterised by the following stages:
(a) the powder is compacted in the cold state into the form of the desired object,
(b) this molded object is subjected in its cold state to an isostatic pressure exceeding 1 T/cm²,
(c) the object is heated under reduced pressure in order to degas it,
(d) the object is heated for 2 to 20 minutes between 1650 and 1830° C. under an essentially nitrogen atmosphere, this latter operation giving rise to the required sintering and densification.

This method is extremely advantageous, because by taking account of the contraction during densification (of the order of 40 to 60% by volume) the object can be formed of approximately the required proportions, for example by moulding or stamping, so enabling further machining to be reduced to a strict minimum. It is also possible to grind the part before sintering (green machining) or after pre-sintering at around 1400° C.

Preferably, after stage (a), which is carried out by the usual known means, stage (b) is carried out at 6 T/cm². To attain this, the molded object can for example be wrapped in a flexible plastic sheet and the whole subjected to a hydrostatic pressure by means of a liquid such as oil in a suitable press. Alternatively, the object can be molded in a rubber mold, the mold then being pressed in a piston press, the forces due to the pressure then becoming distributed uniformly in all directions by way of the material constituting the mold. After cold pressing and removal from the mold, the preformed object (green) is obtained, constituted of agglomerated powder having a "green" density of the order of 1.4 to 1.8, this value depending on the particle size and the crystalline state ($\alpha$, $\beta$ or amorphous form) of the $Si_3N_4$ used for the formulation of the starting composition.

Stages (c) and (d) can be carried out as follows: the green is placed in a graphite crucible provided with a tight fastener (for example of screw type), to reduce any $N_2$ losses by high temperature decomposition, and in order to prevent the green coming into direct contact with the crucible walls during heating, it is embedded in a powder which is inert at high temperature. The powder used can be uncompacted silicon nitride possibly containing boron nitride to prevent the $Si_3N_4$ of this mixture sintering at the temperature used for sintering the part, and thus to facilitate the stripping of the part after cooling. For degassing purposes, it is then heated for about a half hour to one hour at around 800 to 1000° C. under $10^{-3}$ to $10^{-4}$ Torr. A protecting atmosphere (for example $N_2+1\%$ $H_2$) is then introduced, the temperature is raised rapidly to the sintering point, this temperature is maintained for the required time, and finally the whole is allowed to cool. The heating time and sintering temperature are related in the sense that the time is shorter the higher the temperature. Preferably, heating is carried out for about 15 minutes around 1750° C. These conditions are given here only by way of example, but demonstrate the economical importance of the present method. If required, after sintering, the part can be annealed at a temperature (for example of the order of 1600° C.) which modifies its microstructure and improves its mechanical properties.

To prepare the powder mixture constituting the composition of the invention, commercially available ingredients can certainly be used provided their particle size lies within the aforesaid range, they being mixed intimately by the usual means. If the powders used are too coarse, they can be previously ground in suitable crushers or grinders, again by known means. Alternatively, the mixture can be made with such powders and the mixture then pulverized such that after pulverizing, the particles of its constituents have a suitable particle size lying within the aforesaid range. Preferably, an initial $Si_3N_4$ is used having a particle size not exceeding 0.5 μm (specific surface 7–10 m²/g) and an MgO having a particle size of the order of 0.05 to 0.1μ, these then being pulverized together in a mill containing aluminum oxide balls, so that as these latter wear down, the required proportion of aluminum oxide becomes incorporated into the mixture in a finely ground state. Obviously, a mixture of $Si_3N_4$, MgO and $Al_2O_3$ in the required proportions can be initially used, and pulverized in a mill, for example of steel or tungsten carbide. In this case, it is necessary to wash the ground powder with dilute acid (for example HCl) in order to remove from it any traces of iron transferred from the mill, after which it is dried. Preferably, at the moment of molding the object, the composition according to the invention contains 2 to 5% of MgO and 0.2 to 1% of $Al_2O_3$, the most favourable composition being around 5% of MgO and 1% of $Al_2O_3$. Obviously, if required, the composition can also contain other metal oxides in addition, in particular those described in the prior art. However, the proportions of aids are kept as low as possible in order for the proportion of $Si_3N_4$ in the final sintered product to be very high, and its porosity be kept at a minimum level.

In order to attain effective pulverization and dispersion of the constituents of the powder of the present composition, it is advantageous to carry out this operation in a viscous liquid which gives a pasty consistency to the mixture, and which moreover has the advantage of protecting the $Si_3N_4$ from the air (formation of $SiO_2$). The liquid used can be an organic liquid, the type of which is not critical, hydrocarbons and alcohols being well suitable, with preference for the use of a mixture of petroleum ether and tertiary butanol. After pulverizing, the powder is carefully dried, preferably in an oven at 150° C., then under vacuum.

BRIEF DESCRIPTION OF THE DRAWING

The sole FIGURE of the drawing is a plot of the density (along the ordinate) vs. temperature (along the abscissa) illustrating the results obtained with the invention.

SPECIFIC DESCRIPTION

The composition according to the invention and its method of use for manufacturing parts by sintering lead to products having excellent physical properties which are equivalent to or rather better than those of similar known products. The densities obtained after sintering can easily reach 3.10 to 3.15 g/cm³, corresponding to 97–98.5% of the theoretical density calculated by taking account of the presence of the aids (3.20 g/cm³). Generally, their ultimate bending strength (see the measurement description below lies between 70 and 90 kg/mm², although exceptionally values up to 104 kg/mm² have been measured. It should be noted that such results are nearly independent of the crystalline nature of the $Si_3N_4$ initially used. This aspect is illustrated by the accompanying drawing which shows the variations in the density of the product against the sintering temperature (15 minutes) for a composition containing 5% of MgO and 1% of $Al_2O_3$ in addition to the $Si_3N_4$. The curve α represents the use of α-$Si_3N_4$, the curve β represents the use of β-$Si_3N_4$, and the curve A represents the use of amorphous $Si_3N_4$. It can be seen from these curves that optimum density values are attained around 1750° for α-$Si_3N_4$, around 1800° for β-$Si_3N_4$, and at a substantially intermediate value for the amorphous composition. The three forms thus tend towards an identical state during the sintering operation.

The examples given hereinafter illustrate the invention in a more detailed manner.

SPECIFIC EXAMPLES

EXAMPLE 1

In a 500 ml capacity mill containing aluminum oxide balls, 95 g of amorphous $Si_3N_4$ (SYLVANIA SN-402; particle size 0.3 μm, 11 m²/g) were mixed and pulverized for 5 days with 5 g of MgO (MERCK 5865, 0.05 μm) and 200 ml of a 3:1 mixture of petroleum ether (B.P. 35°–45° C.) and tertiary butanol. After eliminating the solvent by drying overnight at 150° at atmospheric pressure then under vacuum, the powder was analyzed and found to contain 1 g of very finely ground powdered $Al_2O_3$, this amount of aluminum oxide resulting from the wear of the balls of the grinding mill during pulverisation. The powder was molded into the form of a mechanical part in a rubber mould and this latter was then subjected (as described heretofore in the introduction) to an isostatic pressure of 6 T/cm² in a hydraulic press. The green thus obtained (d=1.4) was then placed in a graphite crucible provided with a screwed fastener, embedding it in a 1:1 weight mixture of $Si_3N_4$ and BN. Degassing was then carried out for about one hour at 1000°, and the temperature was then rapidly raised, sintering then being carried out for 15 minutes at one of the temperatures (between 1560 and 1810° C.) shown on Table I hereinafter. After cooling, the density of the sintered weight was then measured by picnometry. The results obtained for the sintered samples at various temperatures are summarized in Table I, showing that the optimum density (3.04 g/m³) corresponds to a temperature of 1780° C. and a contraction (by volume) of about 60%.

TABLE I

Sintering of amorphous silicon nitride with 5% of MgO and 1% of aluminum oxide - heating time 15 minutes - influence of temperature

| Sample No. | Temperature °C. | Density g/cm³ green | Density g/cm³ sintered object | Contraction % |
|---|---|---|---|---|
| 6-2 | 1560 | 1.49 | 1.92 | 29.5 |
| 6-1 | 1620 | 1.44 | 2.13 | 38.5 |
| 6-3 | 1687 | 1.38 | 2.60 | 52.6 |
| 6-4 | 1750 | 1.33 | 2.73 | 53.6 |
| 6-5 | 1780 | 1.37 | 3.04 | 59.1 |
| 6-6 | 1810 | — | 2.92 | — |

The variations in the density of the green are due to the inevitable variations in the degree of filling of the mold. It has been found that in fact these variations do not influence the conditions or results of the sintering.

EXAMPLE 2

The method of example 1 is followed, but the amorphous $Si_3N_4$ is replaced in the composition by an identical quantity of α-$Si_3N_4$ (Hermann STARCK, Berlin, particle size 0.5 μm). After compacting, greens are obtained having a density close to 1.90. The sintering conditions (15 minutes) are shown in Table II together with the results.

Under these conditions, the maximum density was obtained for the sample sintered at 1750° C. The density of 3.15 g/cm³ is distinctly greater than the values given for the materials obtained by pressureless sintering following the prior art. Depending on the samples, the modulus of rupture at ambient temperature varied from 72 to 94 kg/mm$^2$**, which is practically equivalent to the values obtained for materials densified by hot pressing. At 1250° C., the bending strength was still 42 kg/mm$^2$.

TABLE II

Sintering α silicon nitride with 5% MgO and 1% Al$_2$O$_3$ - influence of temperature - heating time 15 minutes.

| Sample No. | Temperature °C. | Density g/cm$^3$ green | Density g/cm$^3$ sintered object | Contraction % |
|---|---|---|---|---|
| 1-2 | 1680 | 1.90 | 3.11 | 39.6 |
| 1-3 | 1750 | 1.91 | 3.15 | 40.1 |
| 1-4 | 1810 | 1.91 | 3.06 | 38.6 |

**The modulus of rupture is measured in the following manner: a bar of sintered Si$_3$N$_4$ is cut having a width of p and a thickness of e, and is placed horizontally on two support points separated by a distance D less than the total length of the bar. A central vertical force F is applied between the support points, and the value necessary for rupturing the bar is noted. The modulus is given by σ

$$\sigma = \frac{1.5 \times f(kg) \times D(mm)}{e(mm) \times (mm^2)}$$

EXAMPLE 3

The method of example 2 is followed using a composition identical to that described in this example, and sintering is carried out at 1750° C. for different times as shown in Table III. It can be seen from the results also given in Table III that extremely short sintering times (of the order of only two minutes) give high density sintered products. It can also be seen that heating times in excess of 20 minutes are unfavorable, as a certain degree of decomposition then takes place.

TABLE III

Sintering α silicon nitride with 5% MgO and 1% Al$_2$O$_3$ at 1750° C. - influence of the sintering time.

| Sample No. | Sintering time minutes | Density g/cm$^3$ green | Density g/cm$^3$ sintered object | Contraction % |
|---|---|---|---|---|
| 1-6 | 2 | 2.05 | 3.10 | 34.4 |
| 1-3 | 15 | 1.91 | 3.15 | 40.1 |
| 1-8 | 45 | 1.97 | 2.87 | 31.9 |

EXAMPLE 4

97 g of α silicon nitride (STARCK 1316, particle size 0.5 μm; 7-10 g/m$^2$) were mixed for five days in an aluminum oxide ball mill with 3 g of magnesium oxide (MERCK 5865, particle size 0.05 μm) and 200 cm$^3$ of a 3:1 mixture of petroleum ether (B. P. 35°-45°) and tertiary butanol, this introducing 1% of Al$_2$O$_3$. After eliminating the organic solvent, the powder was pressed isostatically under 6 T/cm$^2$, sheltered from the air (density of the green about 1.90 g/cm$^3$). The sample was then placed in a closed graphite crucible as described under example 1, and degassed at 1000° C. under a vacuum of 10$^{-4}$ Torr, after which it was heated for 15 minutes at the temperatures indicated in Table IV. Under these conditions, maximum density was obtained in the case of the sample heated to 1750° C. Although the value of 3.13 g/cm$^3$ is slightly less than that obtained with 5% of magnesium oxide, it is higher than the values given for the materials previously obtained by pressureless sintering in accordance with the prior art. The modulus of rupture determined at ambient temperature varied from 50 to 70 kg/cm$^3$, depending on the samples.

TABLE IV

Sintering α silicon nitride with 3% MgO and 1% Al$_2$O$_3$ - heating time 15 minutes - influence of temperature

| Sample No. | Temperature °C. | Density g/cm$^3$ green | Density g/cm$^3$ sintered object | Contraction % |
|---|---|---|---|---|
| 8-3 | 1720 | 1.93 | 3.10 | 38.8 |
| 8-1 | 1750 | 1.81 | 3.13 | 43.0 |
| 8-2 | 1780 | 1.88 | 3.10 | 40.2 |

EXAMPLE 5

The method of example 4 was followed, but β-Si$_3$N$_4$ was used as the silicon nitride (MRC-2286 of Material Research Chemicals, U.S.A., particle size 0.5 μm).

The sintering conditions are given with the results in Table V, which shows that the maximum density (3.13 g/cm$^3$) is obtained for 15 minutes of heating at 1813° C. This density is greater than the density of the products obtained by the prior art for pressureless thermal pressing.

TABLE V

Sintering of β silicon nitride with 5% MgO and 1% Al$_2$O$_3$ - sintering time 15 minutes - influence of temperature.

| Sample No. | Temperature °C. | Density g/cm$^3$ green | Density g/cm$^3$ sintered object | Contraction % |
|---|---|---|---|---|
| 2-2 | 1680 | 1.98 | 2.90 | 33.9 |
| 2-1 | 1750 | 2.00 | 2.98 | 33.2 |
| 2-4 | 1810 | 1.95 | 3.13 | 40.15 |
| 2-3 | 1870 | 1.94 | 3.05 | 36.74 |

EXAMPLE 6

(comparative example—influence of the amount of aluminium oxide)

For purposes of comparison with the results of example 4, a sintering powder was prepared containing 97 g of α-Si$_3$N$_4$ and 3% of MgO. This powder was pulverized for only 5 hours in the aluminum oxide ball mill instead of 5 days as in the preceding examples. After this period, the powder contained only about 0.05% of aluminum oxide (traces). This powder was compacted, and samples were prepared as described in the preceding examples (density of the greens 1.97 g/cm$^3$), and these samples were sintered for 15 minutes at 1730° and 1770° C. In the two cases, the final densities were only 2.91 g/cm$^3$, while the corresponding values obtained previously (see example 4) were close to 3.10 g/cm$^3$, so demonstrating the importance of maintaining the quantity of aluminum oxide relative to the quantity of MgO within the aforesaid limits if densities greater than 3 are required.

EXAMPLE 7

(comparative example—influence of the quantity of MgO)

Again for purposes of comparison, the tests described under example 4 were repeated, but using MgO quantities of 2% and 1% respectively. After sintering for 15 minutes at 1750° C., densities of 2.93 and 2.66 g/cm$^3$ respectively were obtained, whereas values of 3.15 and 3.13 g/cm$^3$ had been obtained for 5% and 3% MgO respectively (see examples 2 and 4). These tests demonstrate that at less than 3% MgO, optimum results from the densification viewpoint are not obtained.

I claim:

1. A silicon nitride-based sintering composition in powder form containing magnesium oxide and aluminum oxide as densification aids, the composition consisting essentially of $Si_3N_4$ in a particle size not exceeding 1μ, and the MgO and $Al_2O_3$ as independent particles of a particle size less than the particle size of the $Si_3N_4$, the total amount of the $Al_2O_3$ and MgO being up to 6% by weight of the composition and at least sufficient to impart a density of more than 3.10 g/cm$^3$ to a body formed of the composition by pressureless hot sintering, and the MgO:$Al_2O_3$ weight ratio being from 10:1 to 1:3.

2. A composition as claimed in claim 1 wherein the $Si_3N_4$ is chosen from the α-, β- and amorphous varieties or their mixtures.

3. A composition as claimed in claim 1, characterised by comprising 94% by weight of $Si_3N_4$ having a particle size of 0.5 μm, 5% of MgO having a particle size of 0.05 μm, and 1% of finely ground $Al_2O_3$, all mixed intimately in a ball mill.

4. A method of manufacturing $Si_3N_4$ objects from a silicon nitride-based sintering composition in powder form containing magnesium oxide and aluminum oxide as densification aids, the composition consisting essentially of $Si_3N_4$ in a particle size not exceeding 1μ, and the MgO and $Al_2O_3$ as independent particles of a particle size less than the particle size of the $Si_3N_4$, the total amount of the $Al_2O_3$ and MgO being up to 6% by weight of the composition and at least sufficient to impart a density of more than 3.10 g/cm$^3$ to a body formed of the composition by pressureless hot sintering, and the MgO:$Al_2O_3$ weight ratio being from 10:1 to 1:3, said method comprising the steps of:

(a) compacting the powdered composition in the cold state into the form of the required object, (b) subjecting the preformed object in the cold state to an isostatic pressure of at least 1 T/cm$^2$, (c) degassing the object passed in the cold state by heating under reduced pressure, and (d) heating the degassed object for 2 to 20 minutes between 1650° and 1830° C. in an atmosphere composed essentially of nitrogen, so as to obtain the required sintering and densification.

5. A method as claimed in claim 4 wherein step (d) is carried out for 15 minutes at 1750° C., the composition containing α-$Si_3N_4$.

6. The sintered product obtained by the method defined in claim 4, characterised in that its density exceeds 3.10 and its bending strength at 25° C. is from 70 to 94 kg/mm$^2$.

* * * * *